United States Patent
Rosendall

(10) Patent No.: US 8,531,049 B2
(45) Date of Patent: Sep. 10, 2013

(54) SYSTEM FOR HARVESTING POWER AND METHOD THEREOF

(76) Inventor: Frederick D. Rosendall, Grand Rapids, MI (US)

(*) Notice: Subject to any disclaimer, the term of this patent is extended or adjusted under 35 U.S.C. 154(b) by 91 days.

(21) Appl. No.: 13/132,461

(22) PCT Filed: Oct. 12, 2010

(86) PCT No.: PCT/US2010/052281
§ 371 (c)(1),
(2), (4) Date: Aug. 12, 2011

(87) PCT Pub. No.: WO2011/046912
PCT Pub. Date: Apr. 21, 2011

(65) Prior Publication Data
US 2011/0304154 A1 Dec. 15, 2011

Related U.S. Application Data

(60) Provisional application No. 61/250,732, filed on Oct. 12, 2009, provisional application No. 61/362,198, filed on Jul. 7, 2010.

(51) Int. Cl.
*F03G 3/02* (2006.01)

(52) U.S. Cl.
USPC .............................. 290/1 R; 60/639

(58) Field of Classification Search
USPC ............................................... 60/639
See application file for complete search history.

(56) References Cited

U.S. PATENT DOCUMENTS

| | | | | |
|---|---|---|---|---|
| 4,030,300 A * | 6/1977 | Thompson | ...................... | 60/639 |
| 5,970,712 A * | 10/1999 | Stein | ............................ | 60/639 |
| 7,750,253 B2 * | 7/2010 | Wineland | ........................ | 177/16 |
| 2004/0238284 A1 | 12/2004 | Mathiesen | | |

FOREIGN PATENT DOCUMENTS

| JP | 59185880 A | 10/1984 |
|---|---|---|
| JP | 2001323869 A | 11/2001 |

* cited by examiner

*Primary Examiner* — Tulsidas C Patel
*Assistant Examiner* — Sean Gugger
(74) *Attorney, Agent, or Firm* — Price Heneveld LLP

(57) ABSTRACT

A power harvesting device and method thereof are provided, wherein the power harvesting device is configured to harvest power from at least one falling object and transfer the harvested power. The power harvesting device includes a wheel configured to rotate when the at least one falling object contacts the wheel, wherein the wheel includes an axle, and at least one paddle surface extends radially from the axle. The power harvesting device further includes a linkage device operably connected to the wheel and configured to transfer the harvested power, and the linkage device is further configured to convert mechanical power from the wheel rotating to electrical power and an electrical load electrically connected to the linkage device.

22 Claims, 10 Drawing Sheets

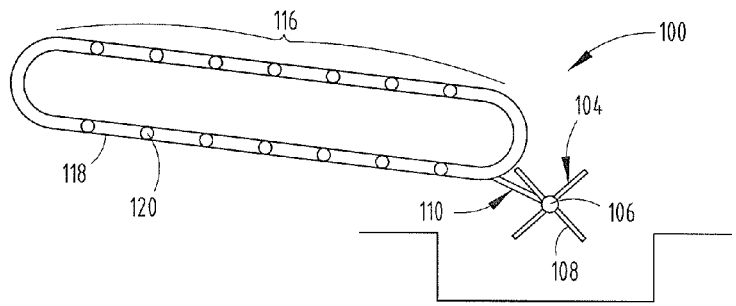
FIG. 3
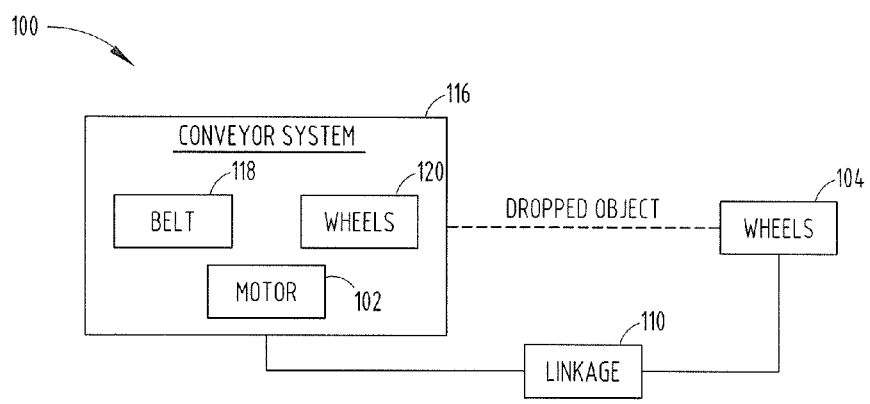
FIG. 4
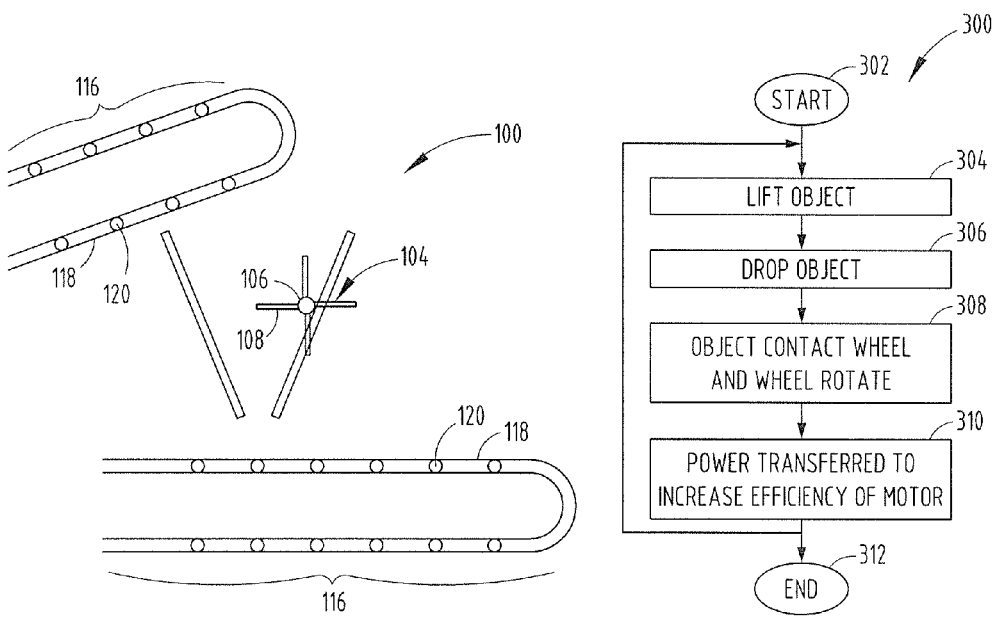
FIG. 5
FIG. 6

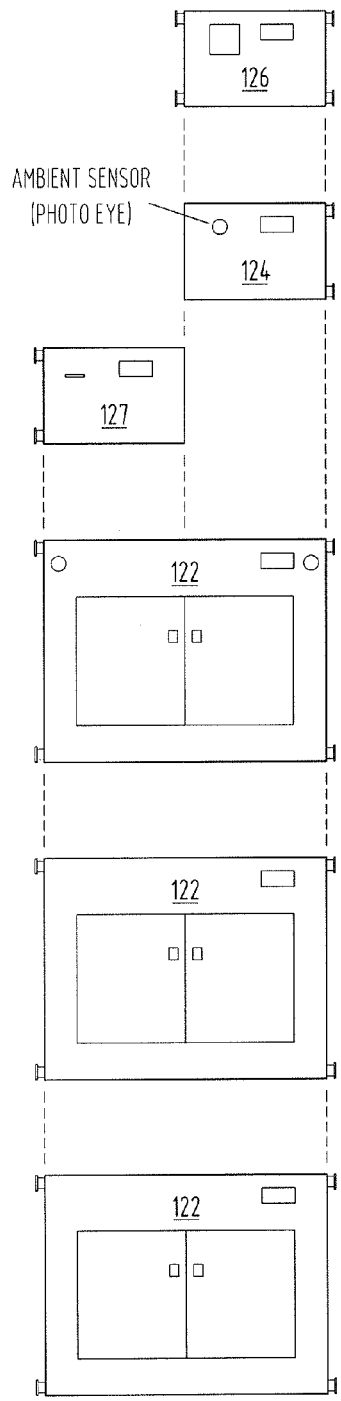
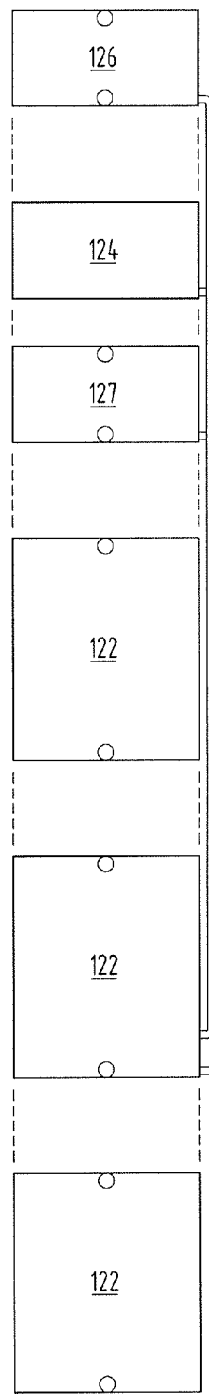
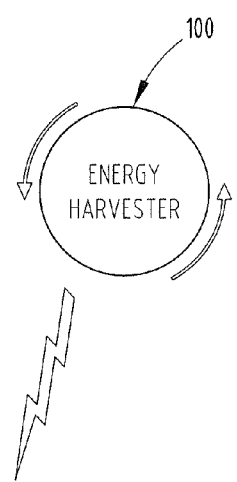
FIG. 12A  FIG. 12B

US 8,531,049 B2

SYSTEM FOR HARVESTING POWER AND METHOD THEREOF

CROSS REFERENCE TO RELATED APPLICATION

This application is claims priority under 35 U.S.C. §119(e) to U.S. Provisional Patent Application No. 61/250,732, filed on Oct. 12, 2009, by Fredrick Dean Rosendall, and U.S. Provisional Patent Application No. 61/362,198, filed on Jul. 7, 2010, by Fredrick Dean Rosendall, the entire disclosures of which are hereby incorporated herein by reference.

FIELD OF THE INVENTION

The present invention generally relates to a system for harvesting power and a method thereof, and more particularly, a system for harvesting power from at least one falling object and a method thereof.

BACKGROUND OF THE INVENTION

Generally, machines are operated using some type of motor, such as electric, steam, or a combustible engine. Typically, there can be a benefit for operating these motors efficiently, such as increased fuel efficiency or an amount of electrical power used by the motor to perform work. One example to increase efficiency is to minimize the amount of friction between components, since friction between components requires the motor to provide more power to overcome the friction.

The use of a motor can also create scenarios where power is created but not harnessed, as harvesting the power would decrease an efficiency of the motor. One such example is a motor being used to power a vehicle to move, wherein air passes past the vehicle as the vehicle moves. A wind turbine can be placed on the vehicle to harness the power generated by the movement of air, but such a wind turbine would have an adverse effect on aerodynamics of the vehicle, thus causing the vehicle to be less efficient. A similar scenario would be arise by an airplane having such a wind turbine, and other vehicles (e.g., trains) powered by various types of engines. Thus, this power typically remains unharnessed due to the inefficiencies of capturing such power.

SUMMARY OF THE INVENTION

According to one aspect of the present invention, a power harvesting device configured to harvest power from at least one falling object and transfer the harvested power is provided. The power harvesting device includes a wheel configured to rotate when the at least one falling object contacts the wheel, wherein the wheel includes an axle, and at least one paddle surface extends radially from the axle. The power harvesting device further includes a linkage device operably connected to the wheel and configured to transfer the harvested power, and the linkage device is further configured to convert mechanical power from the wheel rotating to electrical power and an electrical load electrically connected to the linkage device.

According to another aspect of the present invention, a power harvesting device configured to harvest power from at least one falling object is provided. The power harvesting device includes a motor, and a conveyor operably connected to the motor, wherein the conveyor is configured to lift and drop at least one object from a predetermined height. The power harvesting device further includes a wheel configured to rotate when the object is dropped from the conveyor and contacts the wheel, wherein the wheel includes an axle, and at least one paddle surface extending radially from the axle, and a linkage device operably connected to the wheel and configured to transfer the harvested power. The linkage device is further configured to convert mechanical power from the wheel rotating to electrical power and an electrical load electrically connected to the linkage device.

According to yet another aspect of the present invention, a method of harvesting power from at least one falling object is provided. The method includes the steps of lifting the at least one object to a predetermined height, dropping the at least one object, contacting a wheel with the dropped at least one object, rotating the wheel when the dropped object contacts the wheel, converting mechanical power from the rotating wheel to electrical power, and supplying the electrical power to an electrical load.

These and other features, advantages, and objects of the present invention will be further understood and appreciated by those skilled in the art by reference to the following specification, claims, and appended drawings.

BRIEF DESCRIPTION OF THE DRAWINGS

The present invention will now be described, by way of example, with reference to the accompanying drawings, in which:

FIG. 3 is a side view of a conveyor system having a power harvesting device, in accordance with one embodiment of the present invention;

FIG. 4 is block diagram of a conveyor system having a power harvesting device, in accordance with one embodiment of the present invention;

FIG. 5 is a partial cross-sectional view of a conveyor system having a power harvesting device, in accordance with one embodiment of the present invention;

FIG. 6 is a flowchart illustrating a method of harvesting power, in accordance with one embodiment of the present invention;

FIG. 12A is a front plan, exploded view of modular controllers, in accordance with one embodiment of the present invention; and FIG. 12B is a side plan, exploded view of the modular controllers of FIG. 12A in electrical communication with a power harvesting device, in accordance with one embodiment of the present invention.

DETAILED DESCRIPTION

Figure 1:
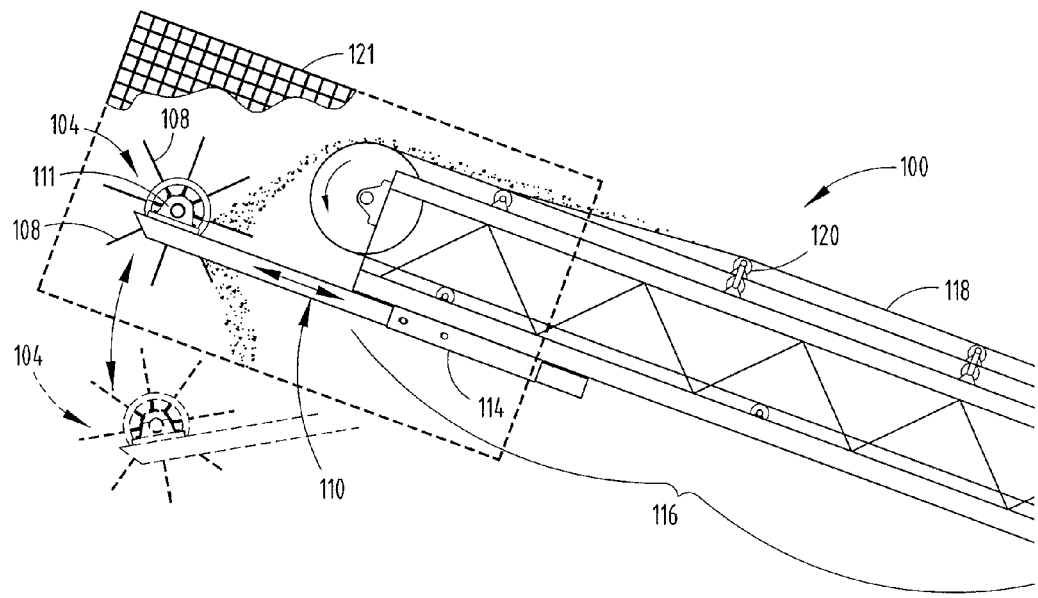
FIG. 1 is a side view of a conveyor system having a power harvesting device, in accordance with one embodiment of the present invention.
Figure 2:
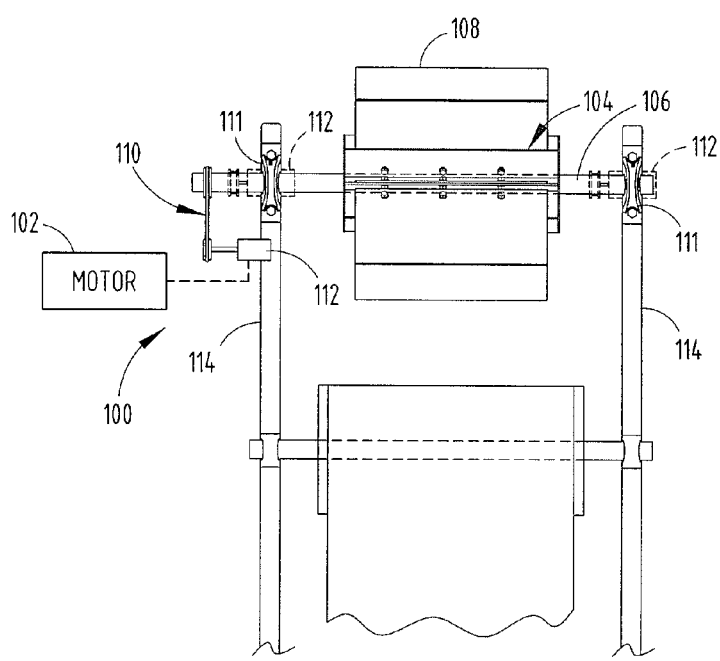
FIG. 2 is a top view of a conveyor system of FIG. 1.
Figure 7A:
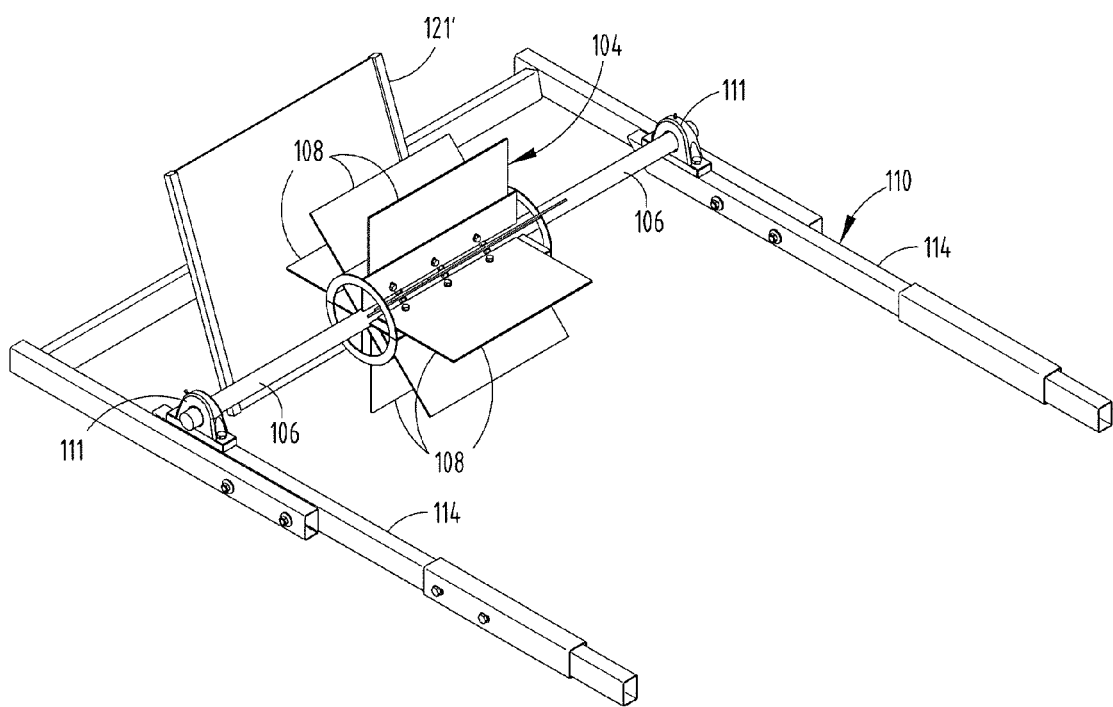
FIG. 7A is a perspective view of a power harvesting device, in accordance with one embodiment of the present invention.
Figure 7B:
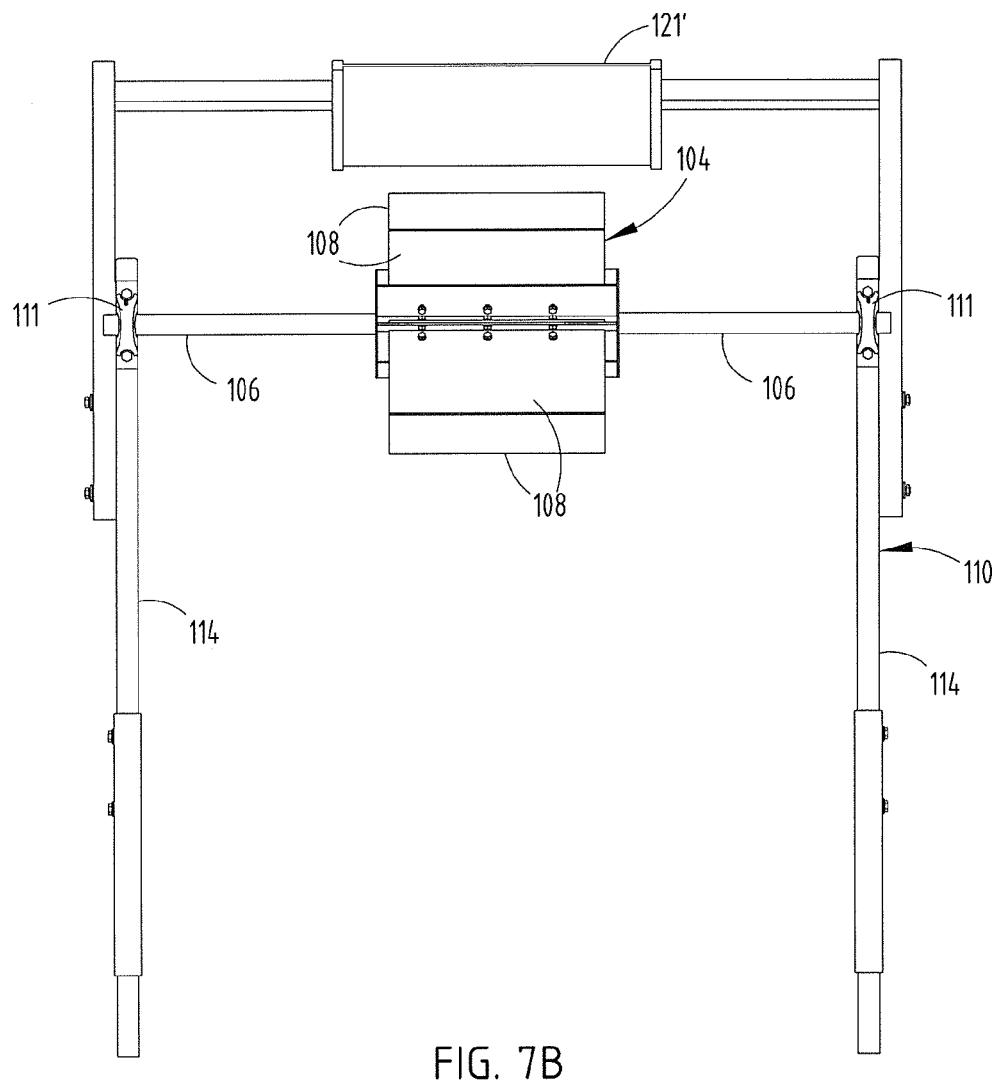
FIG. 7B is a top view of a power harvesting device, in accordance with one embodiment of the present invention.
Figure 7C:
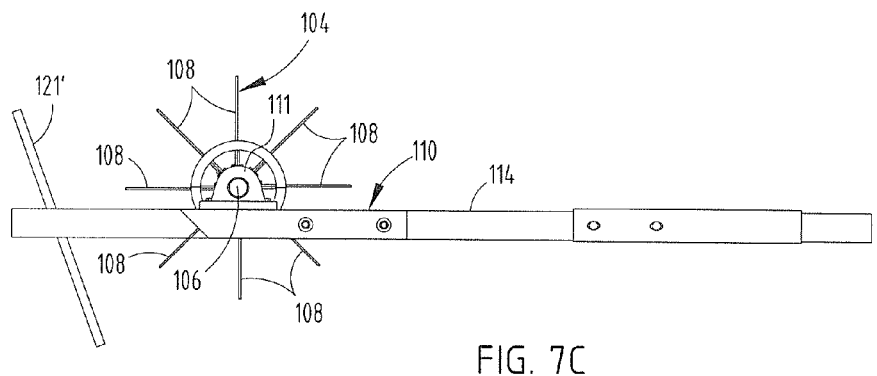
FIG. 7C is a side view of a power harvesting device, in accordance with one embodiment of the present invention.
Figure 7D:
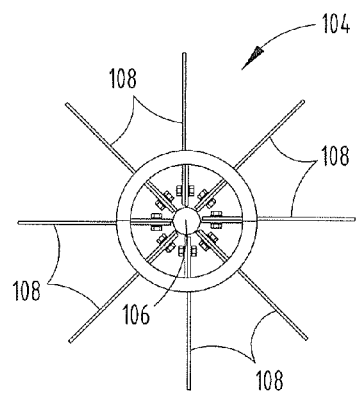
FIG. 7D is a side view of a wheel, in accordance with one embodiment of the present invention.
Figure 7E:
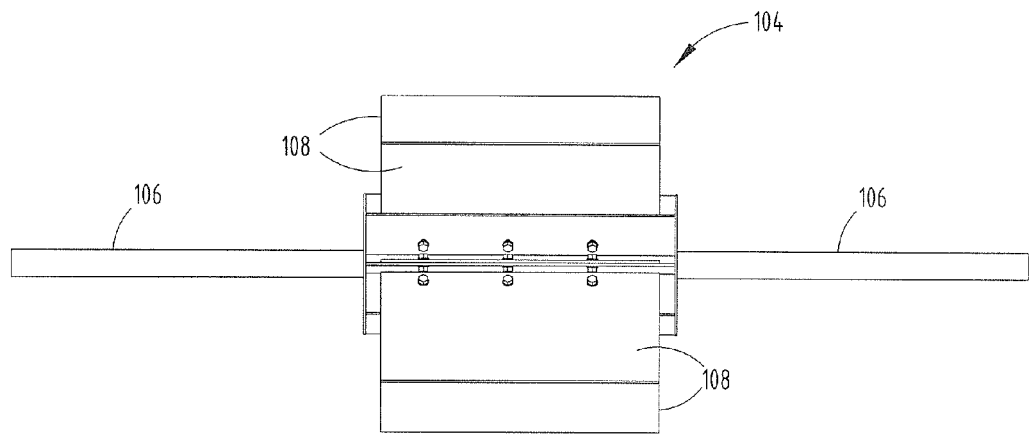
FIG. 7E is a front view of a wheel, in accordance with one embodiment of the present invention.
Figure 8:
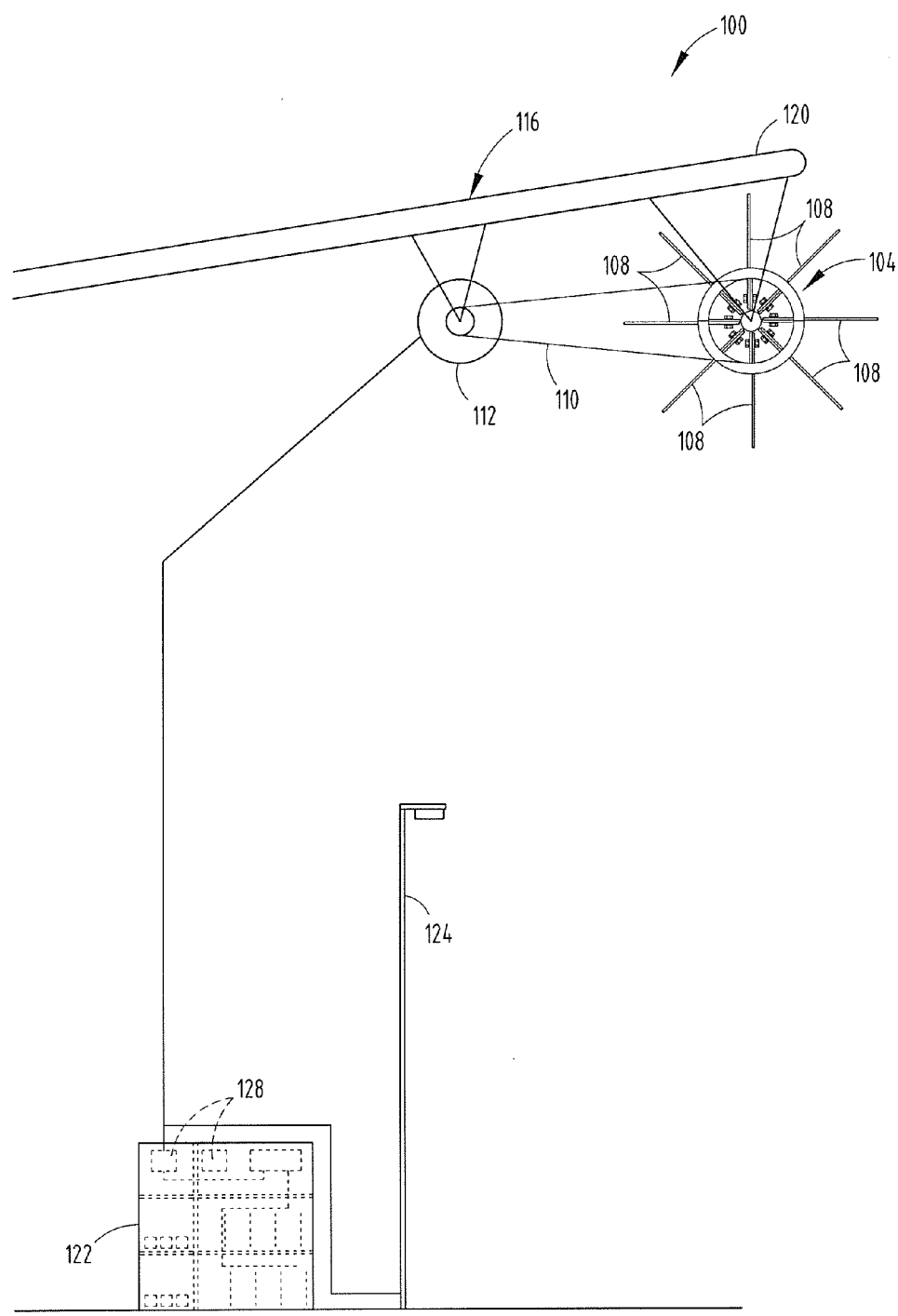
FIG. 8 is a schematic diagram of a conveyor system having a power harvesting device, in accordance with one embodiment of the present invention.

Before describing in detail embodiments that are in accordance with the present invention, it should be observed that the embodiments include combinations of method steps and apparatus components related to a system for recouping or harvesting power and a method thereof. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like reference characters in the description and drawings represent like elements.

In this document, relational terms, such as first and second, top and bottom, and the like, may be used to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

With respect to FIGS. 1-5 and 7-12B, a power harvesting device is generally shown at reference identifier 100. Typically, the power harvesting device 100 is configured to harness, harvest, or recoup power from at least one falling object, and transfer the harvested power. As described in greater detail herein, the harvested power can be used for applying to an electrical load, used so that an efficiency of a motor 102 (FIGS. 2 and 4) is increased, the like, or a combination thereof. The power harvesting device 100 can include a wheel generally indicated at reference identifier 104 that is configured to rotate when at least one falling object contacts the wheel 104. The wheel 104 can include an axle 106 and at least one paddle surface 108 that extends radially from the axle 106. The power harvesting device 100 can further include a linkage device generally indicated at reference identifier 110. The linkage device 110 can be operably connected to the wheel 104 and configured to transfer the harnessed power, as described in greater detail herein.

By way of explanation and not limitation, the motor 102 can provide power to lift at least one object, wherein when the at least one object is dropped, the falling object contacts the wheel 104. When the falling object contacts the wheel 104, the rotation of the wheel 104 results in mechanical or electrical power being harnessed, which can be returned to increase an efficiency of the motor 102. For example, if the motor 102 supplies power equal to ten (10) horsepower (hp) to lift the object, and four (4) hp can be harnessed from the falling object, the motor 102 can be continued to be used while supplying only six (6) hp, and the remaining four (4) hp being provided from the wheel 104 harvesting the power from the falling object. Therefore, the motor 102 runs more efficiently, as only six (6) hp output is needed.

It should be appreciated by those skilled in the art that the power harvesting device 100 can generally be utilized in systems where the at least one object is being picked-up and dropped for purposes other than recouping the power from the falling object.

According to one embodiment, the wheel 104 includes a plurality of paddle surfaces 108 spaced circumferentially around the axle 106. Typically, the paddle surfaces 108 are evenly circumferentially spaced; however, it should be appreciated by those skilled in the art that the paddle surfaces 108 can be evenly circumferentially spaced, unevenly circumferentially spaced, or a combination thereof. The paddle surfaces 108 can be substantially planar surfaces, according to one embodiment. Alternatively, the paddle surfaces 108 can have other suitable shapes and sizes, such as, but not limited to, a curve shape, a rounded shaped, or a combination thereof Any number of paddle surfaces 108 can be used, such as, but not limited to, two (2) to ten (10) (e.g., seven (7) or eight (8)) paddle surfaces (108), the paddle surfaces 108 can be removably attached to the axle 106, and/or the paddle surfaces 108 can be made of multiple materials (e.g., steal, plastic, composite, etc). The axle 106 can have a removable sleeve that extends over the axle 106, wherein the paddle surfaces 108 are connected to the axle sleeve.

The axle 106 can include one or more bearing devices 111, which can typically have greasable bearings, according to one embodiment. The bearing device 111 is illustrated as being on a top side of the linkage 110 in FIG. 1. However, it should be appreciated that the bearing device 111 can be located in other suitable locations, such as, but not limited to, on a bottom side of the linkage 110 (FIG. 10), or within the armature 114. The bearing device 111 can be moveable bearing devices, such that the bearing device 111 is operably connected to the armature 114. Thus, the bearing device 111 can move side-to-side so movement of the axle 106 and wheel 104 can be reduced when spinning Also, a wedge or shim (e.g., a tab) can be used to stop such movement, such that the operable connection of the bearing device 111 and the armarture 114 is substantially a static connection.

The axle 106 is exemplary illustrated in the various figures as being solid, but it should be appreciated by those skilled in the art that the axle 106 can be hollow or tubular. Typically, the axle 106 can have a length of approximately six feet (6 ft), or other acceptable length. In such an embodiment, the axle 106 can be cut to a shorter length to correspond to a width of a conveyor belt 118 or other device that is moving material. Additionally or alternatively, one or more generators 112 can be located in various suitable locations with respect to components of the power harvesting device 100. As exemplary illustrated in FIG. 2, a single generator 112 can be located in any of these identified locations, or a plurality of generators 112 can be included in the power harvesting device 100 and located at any of these identified locations.

According to one embodiment, the linkage 110 transfers electrical power to the motor 102, such that the linkage 110 includes an alternator or generator 112. The linkage 110 can include one or more gears, one or more belts, hydraulic components, the like, or a combination thereof. In such an embodiment, the alternator 112 produces electrical power as a function of the rotating wheel 104. Typically, the rotational movement (e.g., mechanical power) is transferred to the alternator 112 utilizing other components of the linkage 110. The electrical power produced (e.g., converted from mechanical power) can be transferred to the motor 102, other components of the system, components not included in the system, or a combination thereof.

In an embodiment, wherein the electrical power is transferred from the alternator 112 to the motor 102 (e.g., the motor 102 is an electric motor), the motor 102 can receive and utilize the electrical power, and as a result, the motor 102 can draw less electrical power from a primary power source (e.g., power outlet). Thus, the motor 102 operates more efficiently than if the power from the falling object was not recouped or harvested. Such an exemplary embodiment can be generally illustrated in the schematic of FIG. 4.

According to an alternate embodiment, the linkage 110 transfers mechanical power. In such an embodiment, the linkage 110 can be operably connected to a conveyor system generally indicated at reference identifier 116, such that the mechanical power moves the conveyor belt 118, which reduces the amount of forces applied to the motor 102, and thus, causes the motor 102 to be more efficient than if all of the forces remained on the motor 102. Typically, the rotational movement of the wheel 104 as a result of the falling object (e.g., mechanical power) is transferred to the motor 102, other components of the system, components not included in the system, or a combination thereof. It should be appreciated by those skilled in the art that the conveyor system 116 can include additional components, such as, but not limited to wheels 120, wherein the conveyor belt 118 moves with respect to a rotational movement of the wheels 120. Such an exemplary embodiment can be generally illustrated in the diagram of FIG. 4.

According to one embodiment, the linkage 110 includes an armature 114 that extends from the wheel 104 to a structural component of the conveyor system 116. Typically, the armature 114 can be adjustable, such that the distance the wheel 104 is from the end of the conveyor belt 118 for which the objects fall can be adjusted in a horizontal direction, a vertical direction, or a combination thereof. Exemplary adjustable positions are illustrated by the double-headed arrows in FIG. 1.

Additionally or alternatively, a shiv can be used to place the linkage 110 from the wheel 104, such that a distance from the end of the conveyor belt 118 to the end of the wheel 104 can be increased, as compared to an embodiment that does not include a shiv. With respect to an exemplary embodiment illustrated in FIG. 10, the shiv can be an outside shiv mount. It should be appreciated by those skilled in the art that the shiv can be an inside shiv mount.

Whether armature 114 is adjustable or not, the wheel 104 can be at a height when the at least one object is dropped to strike or contact the wheel 104. Thus, the height can be a distance (vertical and/or horizontal) the wheel 104 is from the conveyor belt 118 at the time of manufacturing, or a distance (vertical and/or horizontal) the wheel 104 is from the conveyor belt 118 at the time of adjustment of the armature 114.

According to one embodiment, the power harvesting device 100 can include a plurality of wheels 104 in series with one another. Thus, the one or more falling objects contact and spin at least a portion of the plurality of wheels 104. In such an embodiment, power is harvested from each of the rotating wheels 104. The wheels 104 can be the same design or different design, such that the paddles 108 can be shaped differently based upon the location with respect to the other serial wheels 104.

Additionally or alternatively, a guard 121 and 121' can surround at least a portion of the wheel 104, as exemplary illustrated in FIGS. 1 and 7A-7C, respectively. Typically, the guard 121 can be configured to reduce an amount of the falling objects from being projected outside a desired area after contacting the wheel 104.

The generator 112 can be a permanent magnet or electromagnetic generator, according to one embodiment. However, it should be appreciated by those skilled in the art that the other types of generators can be utilized.

For purposes of explanation and not limitation, the power harvesting device 100 can be used when placing objects in a cargo hold, such as a ship, wherein the objects start at a height higher than the bottom of the cargo hold (FIG. 3). Thus, the wheel 104 can be positioned at a greater distance away from the end of the conveyor belt 118 so that the falling objects obtain higher velocities which increases the force of the object striking on the wheel 104, which results in greater amounts of power harnessed by the power harvesting device 100. Such an embodiment can also be beneficial since an incline of the conveyor belt 118 is decreased (or even be a decline) as compared to when lifting an object to a height for dropping that is greater than the height for which the object originally starts.

According to one embodiment, the wheel 104 is an aggregator, which is used to evenly disperse the falling objects, such that an aggregator (or segregator) is typically already used in a conveyor system 116, and that the harnessed power is otherwise untapped available power. In such an embodiment, the wheel 104 is used to evenly distribute various sizes of objects in a pile, so that larger objects are not mostly congregated on an outside of the pile, and smaller objects are not mostly congregated on a middle of the pile. In other words, the wheel 104 causes a directional change of the falling objects, which can provide an enhanced blend of the objects in a pile and a control of segregation. Thus, in use, the power harvesting device 100 can be used in systems that are rising or picking up at least one object for reasons other than harvesting power created as a function of the object falling under gravitational forces. Generally, aggregators are used by farmers or in quarries to ensure larger objects are not piled together, while smaller objects are piled together (e.g., ensure a mix between the larger and smaller objects).

It should be appreciated by those skilled in the art that the power harvesting device 100 can be used in additional or alternative environments, such as, but not limited to grain conveyor systems 116 (FIG. 5), or other suitable environments wherein at least one object is being dropped. In such an embodiment, the power harnessed by the power harvesting device 100 can be supplied to a conveyor system 116 that is lifting the object, another conveyor in an overall system, or other components, or a combination thereof.

Figure 9:
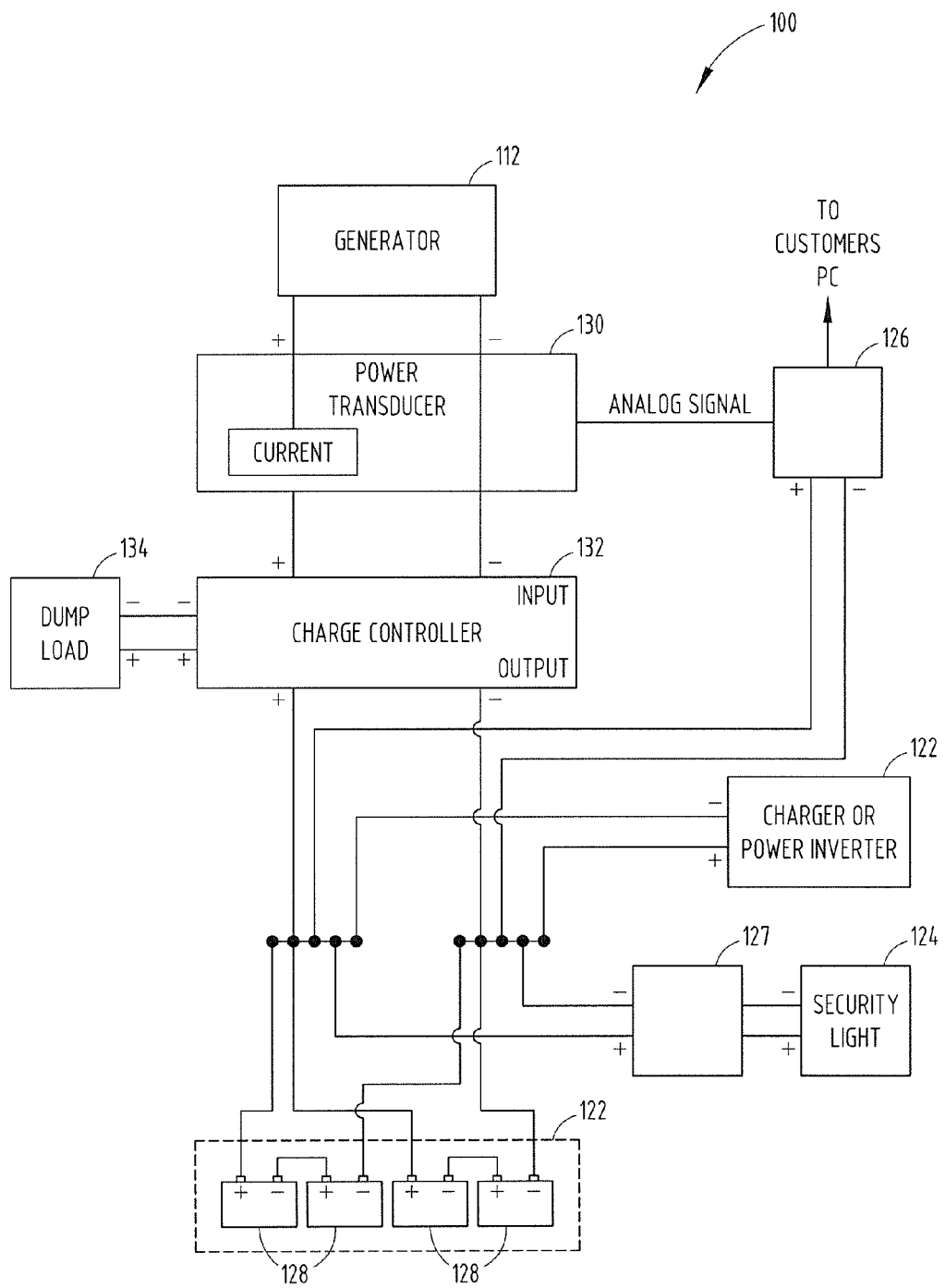
FIG. 9 is a schematic diagram of a power harvesting device, in accordance with one embodiment of the present invention.
Figure 10:
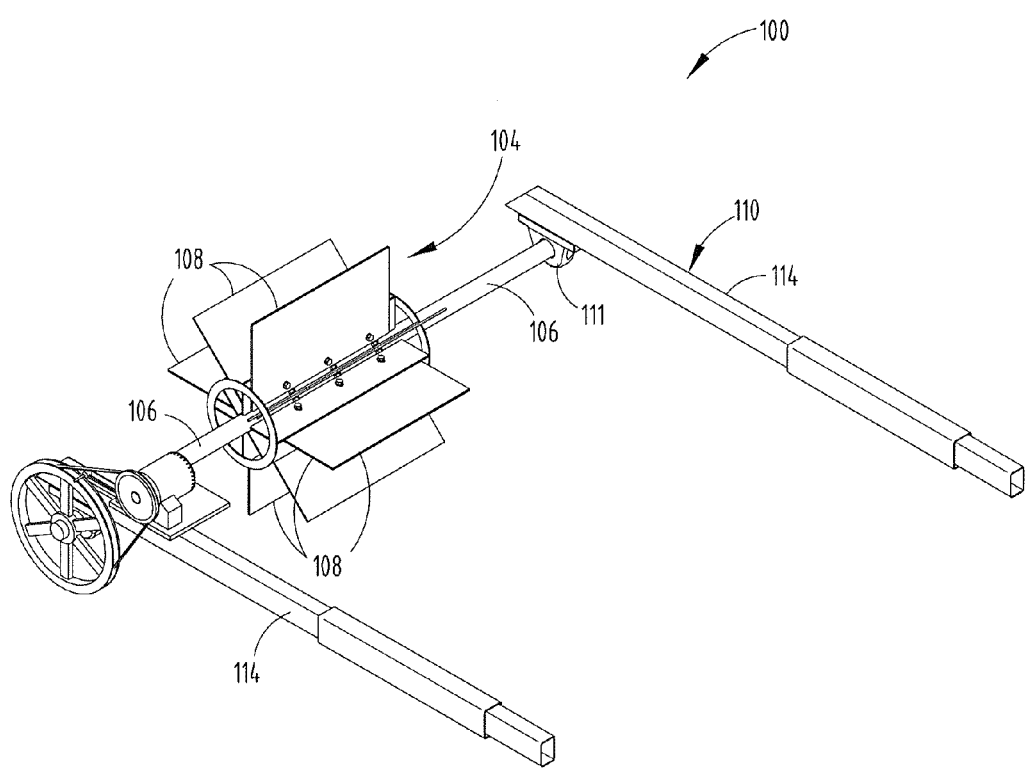
FIG. 10 is a side view of a conveyor system having a power harvesting device, in accordance with one embodiment of the present invention.

As to FIGS. 1-12B, a method of harvesting power from a falling object is generally shown in FIG. 9 at reference identifier 300. The method 300 starts at step 302, and proceeds to step 304, wherein an object is lifted. At step 306 the object is dropped, and at step 308, the object contacts the wheel 104 and the wheel 104 rotates. At step 310 power is transferred from the rotation of the wheel 104. The method 300 can return to step 304, or end at step 312.

It should be appreciated that the falling object can be a liquid (e.g., water), solid, the like, or a combination thereof.

Referring to FIGS. 1-5 and 7-12B, the power harvesting device 100 can be configured to harvest power from at least one falling object, and transfer the harvested power, according to one embodiment. The power harvesting device 100 can include the wheel 104 configured to rotate when the at least one falling object contacts the wheel 104, wherein the wheel 104 includes the axle 106, and the at least one paddle surface 108 extends radially from the axle 106. The power harvesting device 100 can further include the linkage device 110 operably connected to the wheel 104 and configured to transfer the harvested power, and the linkage device 110 is further configured to convert mechanical power from the wheel 104 rotating to electrical power, and an electrical load electrically connected to the linkage device 110. As described in greater detail herein, the electrical load can be, but is not limited to, one or more energy storage devices charging systems 122, one or more lighting devices 124, one or more belt scale devices 126, a camera 127, a conventional belt scale, a control gear that assists with belt alignment-idler pulleys, an automation process, self monitoring device of the power harvesting device 100 if electrical components fail, an alarm to notify a radial stacker when to rotate, a control to move the stacker, a sensor on the conveyor system 116, a security system that can have high-efficiency lighting for premise illumination, closed circuit camera system, communication equipment for alarms and/or data transfer, the like, or a combination thereof.

According to one embodiment, the electrical load can be the belt scale device 126 configured to determine an approximate weight of the at least one falling object over a period of time based upon electrical power supplied by the linkage device 110 to the electrical load. The belt scale device 126 can be a weigh-in-motion system that can provide real-time, hourly, daily, weekly, and/or monthly reports. In such an embodiment, the power harvesting device 100 can be configured to determine a weight per flow rate, such as, but not limited to, calculating tons per hour. Typically, this calculation is based upon the amount of electrical power generated and known operating characteristics of the alternator 112. By way of explanation and not limitation, the rotations per minute (RPM) of the alternator 112 with a load and without a load can be determined. Then a voltage output, a current output, a power (wattage) output, or a combination thereof, of the alternator 112 can be used to determine the tons per hour of material. This can be an approximately linear correlation. Such an embodiment can replace a weight belt on a conveyor. Other variables can be included in the calibration to determine the weight per flow rate, such as, but not limited to, gear reduction, the type of belt, the like, or a combination thereof.

For purposes of explanation and not limitation, when the electrical load is a belt scale, a fixed resistance can be an electrical load for the generator, and a voltage of the system can be monitored to allow an output power to be calculated. Steady-state conditions can be established for data collection. Typically, a three-phase output of the generator can be rectified into a direct current (DC) signal that is communicated to a resistive load, wherein the alternator can have an approximately 42 VDC open circuit voltage. When using a load of approximately 4.5 Ohms, the voltage can be between approximately 24 and 25 VDC, and the voltage can be between approximately 19 and 21 VDC with a decreased flow rate. A ratio in wattage averages (88:133) can be approximately sixty-six percent (66%). Without a flow meter or conveyor scale, the flow rates were calculated from a cross-sectional area of the aggregate on the conveyor. The ratio of the relative area of the cross-sections (27.75:41.25) can be approximately sixty-seven percent (67%). A display can be used to output real-time or instantaneous flow rates, and cumulative totals. Typically, the electrical load, when used as a belt scale, can be a substantially consistent electrical load. However, if a variable electrical load is utilized, operating characteristics of the generator with respect to different loads can be use to determine the flow rate based upon the power output from the generator.

Additionally or alternatively, the power harvesting device 100 can be electrically connected to a smart grid, a charger, the motor 102, the like, or a combination thereof. The charger can include, but is not limited to, charging battery packs, power other devices, supply electrical power to lights directly or through a battery system, a camera, the like, or a combination thereof. Such a charger can include one or more inverters.

With respect to one exemplary embodiment, the electrical load can be the energy storage device charging system 122 that is configured to charge at least one energy storage device 128. The one or more energy storage devices can be, but are not limited to, batteries for flashlights or other portable lighting devices, two-way radios, mobile phones, other communication devices, other suitable device that have portable power supplies, the like, or a combination thereof. Typically, the energy storage device charging system 122 includes adequate hardware and/or software to convert or process the electrical power supplied from the linkage device 110 to the electrical load. Thus, the at least one energy storage device 128 can be at least partially recharged by the harvested energy.

As to another exemplary embodiment, the electrical load can be the one or more lighting devices 124. In such an embodiment, the one or more lighting devices 124 can be high intensity lighting devices configured to illuminate a work area of the power harvesting device 100, the conveyor system 116, or other areas, the lighting device 124 can be a security light, the like, or a combination thereof. Thus, the lighting devices 124 can be at least partially powered by the harvested energy. The lighting device 124 can have optical components, such as, but not limited to, a lens to control an illumination pattern. The illumination pattern can be a flood or spot illumination pattern. An ambient photo detector (e.g., a photo-eye) can be included, such as being integrated with the energy storage device charging system 122, to determine when the ambient light has decreased below a threshold level, so that the lighting device 124 is turned on.

With respect to an exemplary embodiment illustrated in FIG. 9, the power harvesting device 100 can include the generator 112 in electrical communication with a power transducer 130. The power transducer 130 can be configured to alter a DC power received from the generator 112. The power transducer 130 can be in electrical communication with the belt scale 126, such that the power transducer 130 and the belt scale 126 can be the electrical load that is utilized to determine a weight/mass per time of material. The output of the belt scale 126 can then be outputted to a user (e.g., a personal computer).

Additionally or alternatively, the power transducer 130 can be in electrical communication with a charge controller 132 that can control a supply of electrical power to one or more electrical loads. The charge controller 132 can be in electrical communication with the energy storage device charging system 122, the lights 124, the camera 127, a dump load device 134 in order to discharge un-used electrical power, the like, or a combination thereof.

According to one embodiment, sizing can be configured based upon drop zones and applications, and/or a base unit can be configured for multiple conveyor widths. Additionally or alternatively, support arms can be configured to move (e.g., slide) towards a paddle/rotor, and any extra axles can be removed. Female support pockets can be connected (e.g., welded) to the conveyor and the males can be inserted and adjusted to a desired distance. The power harvesting device 100 can also be configured for "in shoot" applications. A male support arm section can flip so that the rotor bearings can be "under" the support arms or on top. Thus, product installation can be more efficient in drop zone(s).

According to one aspect, the power harvesting device 100 is configured to harvest un-utilized energy from a material transfer process based upon the movement of the material without creating any extra load to the primary process, and thus, the power harvesting device 100 captures otherwise wasted energy. One or more power harvesting devices 100 can be used anywhere within a material transfer process where there is a vertical fall of material. Typically, the vertical distance the material travels is approximately 0.775 meters or greater; however, it should be appreciated by those skilled in the art the vertical distance could be less than approximately 0.775 meters. Further, based upon known characteristics of the electrical load and the power supplied thereto, the power harvesting device 100 can be configured to measure and output a weight/mass per time (e.g., tons per hour) of material transferred. Thus, in such an embodiment, the power harvesting device 100 being a weigh-in-motion system can provide real-time, hourly, daily, weekly, monthly, annual, etc. reports about material transferred. Since the power harvesting device 100 creates its power, additional electrical power from external sources are typically not needed to power the computer devices used for such a belt scale operation.

The power harvesting device 100 can be a modular system to allow for variations regarding an amount of power that can be generated at a particular site, use of stored electrical power, an amount of electrical power stored, the like, or a combination thereof, according to one embodiment. Typically, a power output can be adjustable based upon weight/mass per time drop zone in order to meet specific power requirements. Thus, the electrical load can be mounted directly to the conveyor system 116 or closely below a discharge area, such that the power harvesting device 100 can be configured based upon the conveyor system's 116 width, flow rate, material distribution, blending specifications, the like, or a combination thereof. The alternator 112 (e.g., generator) can also be configured based upon the flow rate of the material.

The power from the alternator 112 can be supplied to the electrical load. In an embodiment, wherein the electrical load is the energy storage device charging system 122, the system 122 can include charge controllers and one or more energy storage devices 128. There can be one or more points of connections for devices to be electrically connected to the system 122. Typically, the electrical load, in any of the described embodiments, can be designed for outdoor use, wherein electrical and/or mechanical connections have reduced, if any, adverse affects on the material transfer process. Additionally or alternatively, the electrical load can be configured with a quick connect assembly.

According to one embodiment, the power harvesting device 100 can be configured for sustainable energy harvesting, while providing useful functions. Additionally, the power harvesting device 100 can be configured for one or more of the following: power on and off-hour devices at a remote site without needing to run generators during times of non-production, replace a traditional belt scale, while providing additional power, reclaim otherwise wasted energy at one or more drop zones within a material transfer process, no adding of additional load to existing processes or equipment, flexibility in ultimate use of stored energy, enhanced blending and segregation control of material, one or more portable components, monitor between connection drop zones for enhanced system malfunction alerts, power conventional belt scales, power control gear that assists with belt alignment-idler pulleys, security camera and data collection module (e.g., monitoring safety, motion detector, power draw on conveyor motors or other related motors), a wireless transmitter to transmit data through a wireless protocol (e.g., Ethernet, Wi-Fi, BLUETOOTH™, ZIGBEE™, a local area network (LAN), a cellular connection, a wide area network (WAN)), and small office space with lights and outlets.

By way of explanation and not limitation, in operation, the power harvesting device 100 can average an approximately three hundred fifty (350) tons/hour rate, which can generate approximately one hundred fifty watts (150 W). When the power harvesting device 100 is operated for approximately eight (8) hours, approximately one thousand two hundred watt-hours (1,200 Wh) can be produced. Such electrical power can be adequate to power multiple different devices, such as, but not limited to, the light 124 and the camera 127 simultaneously over an approximately thirty-six (36) hour period (e.g., three (3) twelve (12) hour nights). Typically, for each watt-hour generated by the power harvesting device 100, the light 124 can be operated for approximately eight (8) hours, or the light 124 and camera 127 can be operated simultaneously for approximately four (4) hours.

Additionally or alternatively, twelve (12) gauge wire can be used to electrically connect the generator 112 and the charging system 122, wherein the charging system 122 is located within approximately fifty feet (50 f) of the generator 112. However, when a distance between the generator 112 and the charging system 122 is greater than approximately fifty feet (50 f), such as, but not limited to, approximately seventy feet (70 f), ten (10) gauge wire can be used to electrically connect the generator 112 and the charging system 122. It should be appreciated by those skilled in the art that the charging system 122 can be any suitable distance from the generator 112, and an adequate gauge wire can be used to electrically connect the generator 112 and the charging system 122 based upon the distance.

Figure 11:
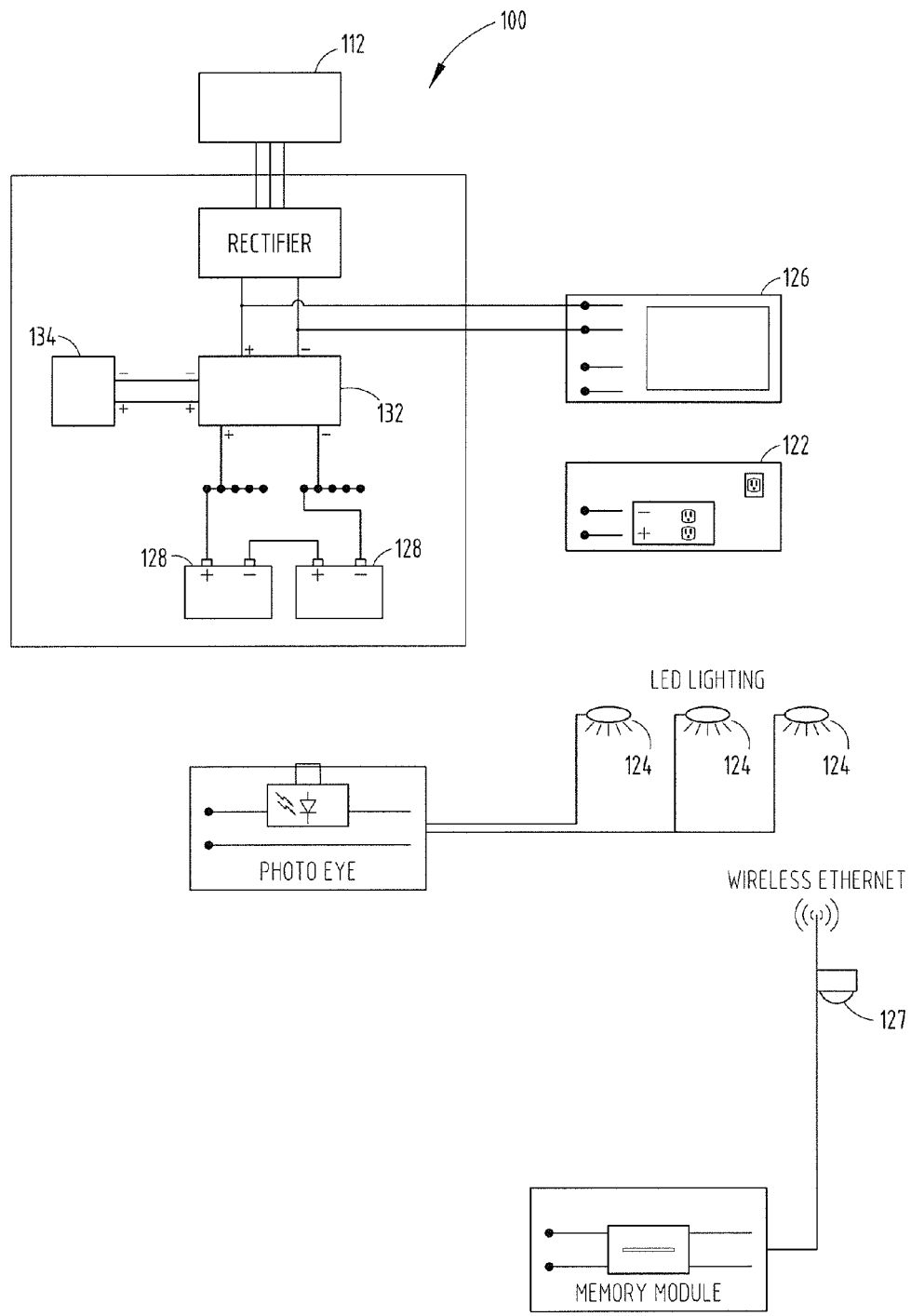
FIG. 11 is a schematic diagram of a system having a power harvesting device, in accordance with one embodiment of the present invention.

According to one embodiment, as exemplary illustrated in FIGS. 11-12B, the power harvesting device 100 can have multiple interchangeable functions, such as, but not limited to, the energy storage device charging system 122, the light 124, the belt scale 126, the camera, the like, or a combination thereof. In such an embodiment, each function can have an attachable/detachable modular controller that can be electrically connected to the power harvesting device 100. Additionally or alternatively, the modular controllers can be press-fit and/or plug connectors (or other suitable connectors) so that a post-manufacturing consumer can change modular controllers electrically connected to the generator 112. Thus, the modular controllers can be configured to electrically connect to a base unit, wherein the base unit is supplied electrical power from the generator 112, such that one or modular controllers can be electrically connected to the base unit.

One or more power harvesting devices 100 can be in electrical communication with a modular controller. Thus, if there are multiple drop zones where power harvesting devices 100 are located and/or multiple power harvesting devices 100 at a single drop location, the multiple power harvesting devices 100 can each supply electrical power to a single modular controller.

For purposes of explanation and not limitation, a design of the power harvesting device 100 should consider a "break-even" point in economic payback, such that a design-life should be considered as part of a true cost equation. After a break-even point is met, the subsequent electrical power that is generated can be a net-positive and can be seen as income. A ratio of the design-life to the payback period can give an investment payback (e.g., a fifteen (15) year design-life with seven and a half (7½) year break-even point is a two hundred percent (200%) payback). It should be appreciated by those skilled in the art that there can be additional variables that affect the payback period, such as energy savings tax credits for sustainable energy sources.

Advantageously, the power harvesting device 100 and method 300 harness power from falling objects which is otherwise lost, to increase an efficiency of a motor lifting the object, power other electrical devices, supply electrical power to a power grid, or a combination thereof. Thus, the objects have to be lifted for other purposes, and the harvesting of the power can increase the efficiency of the motor lifting the objects. It should be appreciated by those skilled in the art that additional or alternative advantages may be present from the power harvesting device 100 and method 300. It should further be appreciated by those skilled in the art that the above elements and steps can be combined in additional or alternative ways not explicitly described herein.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

I claim:

1. A power harvesting device configured to harvest power from at least one falling object, and transfer the harvested power, said device comprising:
    a wheel configured to rotate when the at least one falling object contacts said wheel, wherein said wheel comprises:
        an axle; and
        at least one paddle surface extending radially from said axle;
    a linkage device operably connected to said wheel and configured to transfer the harvested power, and said linkage device is further configured to convert mechanical power from said wheel rotating to electrical power, wherein the linkage includes an armature operably connected to the wheel, and wherein the armature is configured to move the wheel between a first position and a second position in relation to a dropping point of the falling object, wherein the second position is farther from the dropping point than the first position; and
    an electrical load electrically connected to said linkage device.

2. The power harvesting device of claim 1 further comprising a motor operably connected to a conveyor, wherein the at least one falling object falls from said conveyor, and said linkage supplies electrical power to said motor.

3. The power harvesting device of claim 1 configured to be operably connected in a conveyor system.

4. A power harvesting device configured to harness power from at least one falling object, said device comprising:
    a motor;
    a conveyor operably connected to said motor, wherein said conveyor is configured to lift and drop at least one object from a predetermined height;
    a wheel configured to rotate when the object is dropped from said conveyor and contacts said wheel, wherein said wheel comprises:
        an axle; and
        at least one paddle surface extending radially from said axle;
    a linkage device operably connected to said wheel and configured to transfer the harvested power, and said linkage device is further configured to convert mechanical power from said wheel rotating to electrical power, wherein the linkage includes an armature that extends from the conveyor to the wheel, and wherein the armature is configured to move the wheel between a first position and a second position relative to the predetermined height, and wherein the second position is farther from the predetermined height than the first position; and
    an electrical load electrically connected to said linkage device.

5. The power harvesting device of claim 1, wherein said at least one paddle surface comprises a plurality of paddle surfaces spaced circumferentially around said axle.

6. The power harvesting device of claim 4, wherein said linkage device transfers electrical power to said motor.

7. The power harvesting device of claim 1, wherein said linkage device comprises a generator.

8. The power harvesting device of claim 1, wherein said electrical load is an energy storage device charging system that is configured to charge at least one energy storage device.

9. The power harvesting device of claim 1, wherein said electrical load is a lighting device.

10. The power harvesting device of claim 1, wherein said electrical load is a belt scale device configured to determine an approximate weight of the at least one falling object over a period of time based upon electrical power supplied by said linkage device to said electrical load.

11. The power harvesting device of claim 1, wherein said electrical load is at least one modular controller.

12. A method of harvesting power from at least one falling object, said method comprising the steps of:
    lifting the at least one object to a predetermined height;
    dropping the at least one object;
    contacting a wheel with said dropped at least one object;
    rotating said wheel when said dropped object contacts said wheel;
    positioning the wheel in one of a first position and a second position in relation to a dropping point of the object using an armature, wherein the second position is farther from the dropping point than the first position;
    converting mechanical power from said rotating wheel to electrical power; and
    supplying said electrical power to an electrical load.

13. The method of claim 12 further comprising the step of:
    charging at least one energy storage device, such that said electrical load is an energy storage device charging system.

14. The method of claim 12 further comprising the step of:
    illuminating a light source, such that said electrical load is a lighting device.

15. The method of claim 12 further comprising the step of:
    determining an approximate weight of said dropped at least one object over a period of time.

16. The method of claim 15, wherein said approximate weight over said period of time is based upon said electrical power supplied to said electrical load.

17. The power harvesting device of claim 4, wherein said at least one paddle surface comprises a plurality of paddle surfaces spaced circumferentially around said axle.

18. The power harvesting device of claim 4, wherein said linkage device comprises a generator.

19. The power harvesting device of claim 4, wherein said electrical load is an energy storage device charging system that is configured to charge at least one energy storage device.

20. The power harvesting device of claim 4, wherein said electrical load is a lighting device.

21. The power harvesting device of claim 4, wherein said electrical load is a belt scale device configured to determine an approximate weight of the at least one falling object over a period of time based upon electrical power supplied by said linkage device to said electrical load.

22. The power harvesting device of claim 4, wherein said electrical load is at least one modular controller.

* * * * *